Sept. 17, 1935.        R. M. NARDONE                2,014,662
                    AUTOMATIC TRANSMISSION
                    Filed Nov. 28, 1933       2 Sheets-Sheet 2
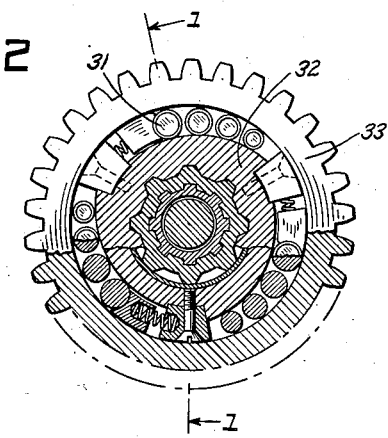
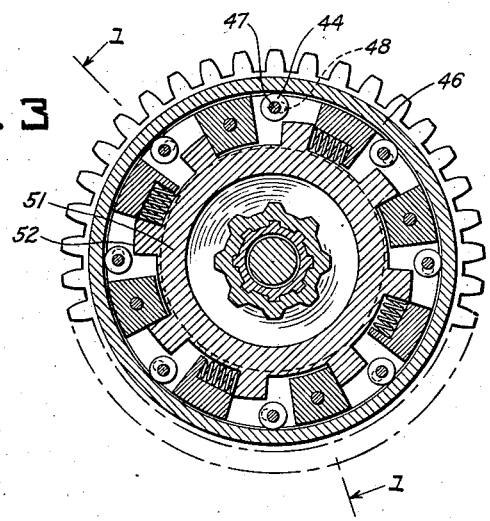
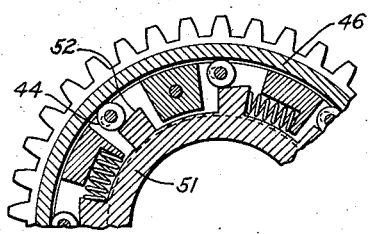
INVENTOR.
Romeo M. Nardone
BY Warren T. Hunt
ATTORNEY.

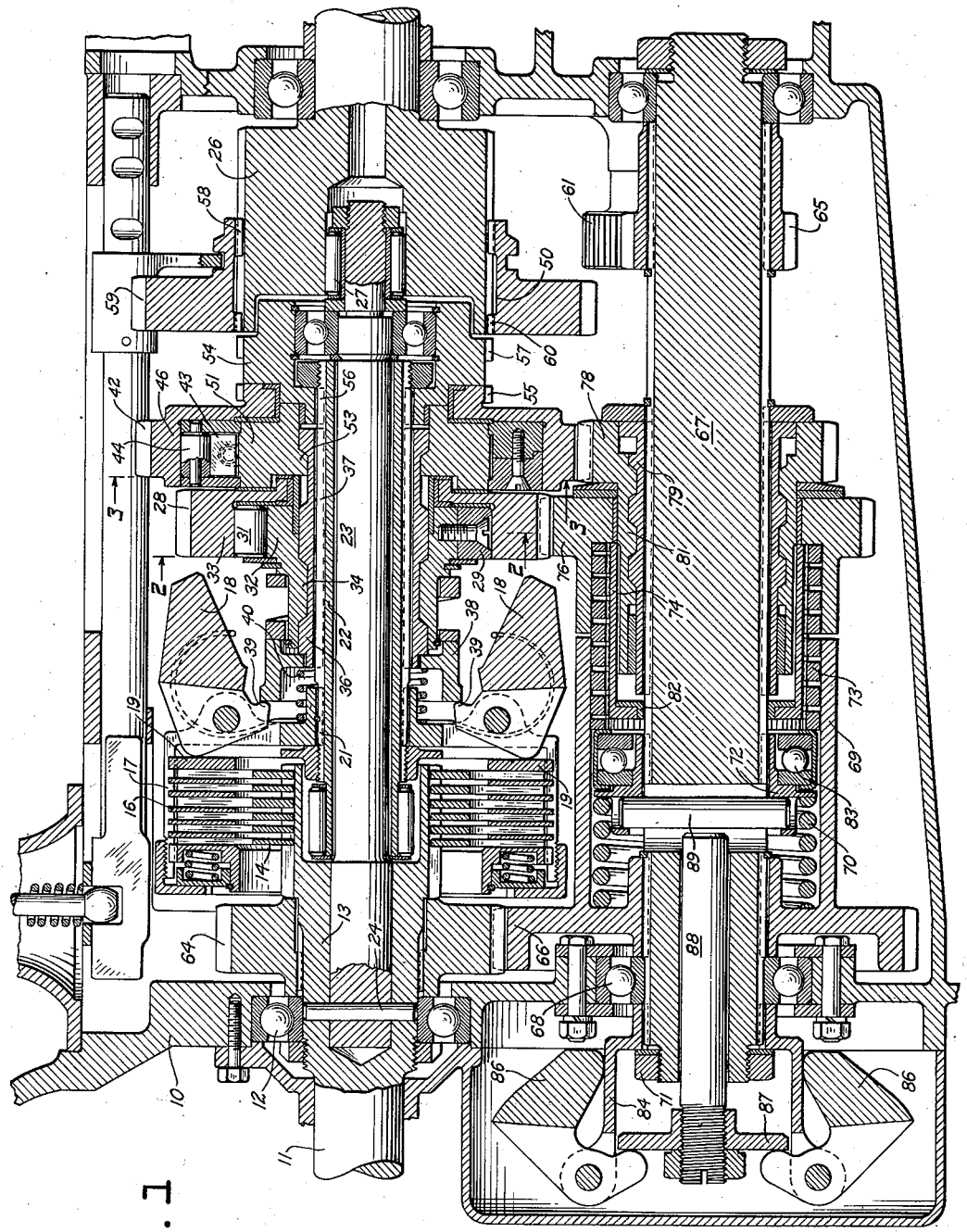

Patented Sept. 17, 1935

2,014,662

UNITED STATES PATENT OFFICE 2,014,662

AUTOMATIC TRANSMISSION

Romeo M. Nardone, East Orange, N. J., assignor to Eclipse Aviation Corporation, East Orange, N. J., a corporation of New Jersey Application November 28, 1933, Serial No. 700,157

12 Claims. (Cl. 74—336)

This invention relates to transmission mechanisms and more particularly to an automatic variable speed transmission mechanism.

The transmission shown and described herein is somewhat similar to the transmission shown in my co-pending application Serial No. 617,887, filed June 17, 1932, wherein the invention is broadly claimed.

The present application differs therefrom principally in the arrangement of the low speed gear mechanism and the means whereby the intermediate gear train is disconnected.

An object of the invention is to provide an automatic variable speed transmission in which the selection of the various speed ratios is responsive to load at constant speeds and responsive to speed at constant loads, or in other words, a torque and speed responsive transmission.

Another object of the invention is to provide a three speed automatic transmission in which the high speed driving means is disengaged by the low speed devices and the intermediate speed driving means is disengaged by a separate device operated by the low speed gear means.

Another object of the invention is to provide a transmission with a novel countershaft with which the second speed disconnecting means is associated.

Another object of the invention is to provide an automatic transmission with two friction clutches whereby the driving and driven shafts are connected, each of which is responsive to speed and load.

Another object of the invention is to provide a variable speed transmission with a novel countershaft upon which is mounted centrifugal and torque responsive mechanism for controlling at least one of the gear changes.

Other objects and features of the invention will be apparent from the following description in connection with which a preferred embodiment of the invention is illustrated in the accompanying drawings in which:

Fig. 1 is a vertical section of a transmission illustrating the improved transmission;

Fig. 2 is a sectional view of the second speed gear overrunning clutch taken along the line 2—2 of Fig. 1;

Fig. 3 is a sectional view of the low speed overrunning clutch taken along the line 3—3 of Fig. 1; and Fig. 4 is a fragmental view similar to Fig. 3 illustrating the position of the low speed overrunning clutch in its operating position.

Referring to the drawings, the transmission housing is shown at 10 in which the driving shaft 11 is rotatably mounted by bearing 12 and carries on its inner end a clutch hub 13 upon which are slidably mounted frictional driving plates 14 interposed between similar driven frictional plates 16 which are splined to the high speed clutch housing 17. The clutch is controlled by centrifugal weights 18 which in the driving position contact pressure plates 19 and force the driving and driven plates into contact and frictionally connect the clutch housing 17 to the driving shaft 11. Clutch housing 17 is splined at 21 to the tubular driven shaft 22 that is rotatably mounted upon the driving shaft 23 that is connected to hub 13 by pin 24, the opposite end of shaft 23 being rotatably mounted in propeller shaft 26 by bearing 27.

Second speed gear 28 is connected to driven shaft 22 through an overrunning clutch 29, which connects the hub 32 with the toothed portion 33 through rollers 31 when the toothed portion becomes the driving member to rotate the gear in a clockwise direction, as viewed in Fig. 2, but permits the hub 32 to overrun the outer member in the same direction. Hub 32 is provided with a threaded portion 34 and coacts with a threaded nut 36 having a splined connection with the driven shaft 22 at 37. Nut 36 is movable axially along shaft 22 and carries a member 38 adapted to contact the noses 39 of weights 18 30 and force them to their inner position when nut 36 is moved toward the left against the tension of spring 40, as viewed in Fig. 1. The pitch of nut 36 is such as to be moved toward the left when the second speed gear 28 becomes the driving member.

The low speed gear 42 is connected to driven shaft 22 through an overrunning clutch 43 of somewhat different design which comprises rollers 44 having a slight angular movement with respect to the toothed member 46 by reason of the supporting pin 47 which is movable in slots 48. Hub 51 is provided with cam portions 52 that are out of contact with rollers 44 in the overrunning position illustrated in Fig. 3 and which coact with the rollers to connect the toothed portion 46 with the hub 51 in the driving position, as shown in Fig. 4. The low speed overrunning clutch, as above described, forms the subject matter of co-pending application Serial No. 644,497, filed November 26, 1932 by Francis Linder, and is not claimed in the present application per se. The hub 51 of the low speed gear is provided with a threaded portion 53 which coacts with nut 36 to force the same toward the left, as viewed in Fig. 1, to disengage the weights 18 of the high speed clutch in the same manner as described in connection with the action of the intermediate speed gear.

A driving member 54 is splined to the driven shaft 22 at 56 and is provided with teeth 57 which are adapted to engage similar teeth 60 of gear 59 which is slidable toward the left to connect member 54 with propeller shaft 26 for direct drive in any one of the above described three forward speeds, and is slidable toward the right to engage idler gear 61, for the reverse drive gear 61 is in constant mesh with gear 65 secured to the countershaft 67.

The driving shaft 11 is provided with a gear 64 that meshes with gear 66 secured to the countershaft 67 which is rotatably mounted in case 10 by bearing 68. Gear 66 is provided with a tubular extension 69 within which is mounted a spring 70 adapted to engage collar 72 and compress spiral spring 73 through thrust bearing 83. Spring 73 has its inner surface splined to sleeve 74 which prevents the individual coils from rotating relatively to one another and causes the coils to expand radially upon an application of axial pressure, to frictionally connect gear 76 to the tubular extension 69. The initial compression of spring 70 is such as to overcome the force of clutch spring 73 and to cause the same to frictionally connect gear 76 to gear 66. Low speed gear 78 is connected to the countershaft 67 through a slidable nut 79 having a splined connection with countershaft 67 and a threaded connection with the low speed gear hub 81. The pitch of the thread is such that a load on gear 78 will force nut 79 toward the left, as viewed in Fig. 1, to engage the flanged end 82 of sleeve 74 and force it against thrust bearing 83 to relieve the pressure of spring 70. A member 84 is secured to the countershaft 67 by nut 71 upon which are pivotally mounted centrifugal weights 86 adapted to move outwardly by centrifugal force and engage flange 87 which is adjustably secured to shaft 88. The arrangement of the weights 86 is such as to cause shaft 88 to move toward the right at high speeds and engage pin 89 to move the same toward the right and augment the force of spring 70.

In the operation of the device, the high speed drive is accomplished as follows: Weights 18 are in their outer position, driving shaft 11 is directly connected to driven shaft 22 by means of clutch plates 14 and 16, and the drive is taken to the propeller shaft 26 by means of gear 59 which is assumed to have been moved toward the left to engage member 54.

*Intermediate speed drive.*—If during the operation of the transmission, the load upon the high speed clutch should be greater than the frictional capacity of plates 14 and 16, they will slip relative to one another and cause second speed gear 28 to transmit a portion of the driving load whereupon nut 36 will move toward the left to disengage weights 18 and the drive will be taken through the intermediate speed mechanism by means of gear 64, gear 66, sleeve 69, gear 76, gear 28, nut 36, and shaft 22, it being previously stated that the initial compression of spring 70 is sufficient to transmit torque between sleeve 69 and gear 76.

*Low speed drive.*—If the load on the intermediate speed gear mechanism should be great enough to overcome the frictional resistance of spring 73, gear 76 and gear 66 will move relatively to one another, whereupon gear 42 will come into driving engagement and nut 79 will be moved toward the left. Sleeve 74 will move bearing 83 to compress spring 70 and permit spring 73 to expand axially and contract radially to release gear 76 from the countershaft 67. The release of gear 76 from the countershaft will also relieve the driving load from gear 28 and weights 18 will have a tendency to assume their outer position, but this is counteracted by the threaded engagement of hub 51 of the low speed gear with nut 36 which will continue to hold weights 18 in their inner position. It will be noted that weights 86 have a tendency to augment the force of spring 70 at the higher speeds and that the disengagement of spring 73 is dependent not only upon the torque load on the countershaft, but is also dependent upon the speed at which the countershaft 67 is driven. The operation of weights 86 is similar to that of weights 18, but it should be noted that although weights 18 are driven by the driven shaft 22 and are therefore responsive to driven shaft speed, the weights 86 are directly driven by the driving shaft 11 through gears 64 and 66 and therefore the speed of weights 86 is responsive to the speed of the driving shaft 11.

*Positive low speed drive.*—In descending a hill with a vehicle equipped with the present transmission, the high speed clutch will always be engaged because of the reversal of torque; therefore, the engine may not be used as a brake in the lower speed ratios. In order to permit the engine to be used as a brake in the low speed ratio, provision is made to directly connect the outer portion of gear 42 with the propeller shaft 26. To this end, teeth 55 are formed on gear 42 which mesh with teeth 60 when gear member 59 is moved to its extreme left position. In this position, the drive from the propeller shaft 26 to shaft 11 is by means of gears 42, 78, 66 and 64. Shaft 22 will be rotated at a higher speed than either of the second or low speed gears 28 or 42 by reason of the high speed clutch engagement, therefore it will overrun both gears and there will be no driving connection other than through the gear train mentioned, it being noted that member 54 is free to rotate within gear 59 by reason of cut-out portion 50.

In the operation of the automatic gear mechanism, the change from low gear to intermediate gear is obtained when the speed of the countershaft and the load thereon is such as to cause spring 73 to frictionally connect sleeve 69 and gear 76, whereupon the intermediate gear mechanism again assumes the load. The change from intermediate gear to high gear is obtained when the centrifugal force of weights 18 is sufficient to overcome the axial thrust force of nut 36 whereupon the nut is forced toward the right and the weights 18 engage the frictional plates 14 and 16 and the high speed direct connection is established.

Although a preferred embodiment of the invention has been illustrated and described, it is to be understood that the invention is illustrative only and is not limited to the form shown and described, or otherwise, except by the terms of the following claims.

What is claimed is:

1. In a variable speed transmission, a driving shaft, a driven shaft, means for connecting the shafts in a high speed gear ratio including a speed responsive clutch having a portion rotatable with each of the shafts for directly connecting the same, means for connecting the shafts in an intermediate gear ratio including a friction clutch responsive to the speed of one of the shafts, means for connecting the shafts in a low speed ratio, means responsive to torque reaction of the intermediate gear means and directly operated thereby for controlling the high gear connecting means, means associated with the low speed gear means and acting upon the high speed clutch for controlling the same, and torque responsive means directly operated by the low speed gear means and acting upon the intermediate gear speed responsive clutch for controlling the same.

2. In a variable speed transmission, a driving shaft, a driven shaft, means for connecting the shafts in a high speed gear ratio including a speed responsive clutch having a portion rotatable with each of the shafts for directly connecting the same, means for connecting the shafts in an intermediate gear ratio including a friction clutch responsive to the speed of one of the shafts, means for connecting the shafts in a low speed ratio, means responsive to torque reaction of the intermediate gear means and directly operated thereby for controlling the high gear connecting means, means associated with the low speed gear means and acting upon the high speed clutch for controlling the same, and means including a nut having a threaded connection with the low speed gear means and directly movable thereby into contact with the intermediate speed clutch to disengage the same upon an increase of load on the low speed gear means.

3. In a variable speed transmission, a driving shaft, a driven shaft, a counter shaft, means for connecting the driving and driven shafts in a high speed ratio, means including a speed responsive clutch and the counter shaft for connecting the driving and driven shafts in an intermediate gear ratio, means including the countershaft for connecting the driving and driven shafts in a low speed ratio, torque responsive means operated by the low and intermediate gear means and acting upon the high speed gear connecting means for controlling the same, and means on the countershaft operated by the low speed gear and acting upon the intermediate speed gear clutch for controlling the same.

4. In a variable speed transmission, a driving shaft, a driven shaft, a countershaft, means including a speed responsive clutch for connecting the driving and driven shafts in a high speed ratio, means including a speed responsive clutch and the countershaft for connecting the driving and driven shafts in an intermediate gear ratio, means including the countershaft for connecting the driving and driven shafts in a low speed ratio, torque responsive means operated by the low and intermediate gear means and acting upon the high speed gear clutch for controlling the same, and means on the countershaft operated by the low speed gear and acting upon the intermediate speed gear clutch for controlling the same.

5. In a variable speed transmission, a driving shaft, a driven shaft, a countershaft, means for connecting the driving and driven shafts in a high speed ratio, means including a clutch responsive to driving shaft speed on the countershaft for connecting the driving and driven shafts in an intermediate gear ratio, means including the countershaft for connecting the driving and driven shafts in a low speed ratio, torque responsive means operated by the low and intermediate gear means for controlling the high speed gear connecting means, and a sleeve slidable on the countershaft having a threaded connection with the low speed gear for controlling the intermediate speed gear clutch.

6. In an automatic variable speed transmission, a driving shaft, a driven shaft, means including a clutch responsive to driven shaft speed for connecting the shafts in high speed ratio, means including a clutch responsive to driving shaft speed for connecting the shafts in an intermediate speed ratio, means for connecting the shafts in a low speed ratio, torque responsive means operated by both the intermediate and low speed gear means and acting upon the high speed clutch for controlling the same, and torque responsive means operated by the low speed gear and acting upon the intermediate speed clutch for controlling the same.

7. In an automatic variable speed transmission, a driving shaft, a driven shaft, means including a clutch responsive to driven shaft speed for connecting the shafts in high speed ratio, means including a friction clutch for connecting the shafts in an intermediate speed ratio, means for connecting the shafts in a low speed ratio, torque responsive means having a threaded connection with both the intermediate and low speed gear means for controlling the high speed clutch, and means operated by the low speed gear for disconnecting the intermediate speed clutch at a predetermined load resistance on the low speed gear means.

8. In an automatic transmission, a driving shaft, a driven shaft, a friction clutch for connecting the shafts in a high speed gear ratio, centrifugal weights associated with the driven shaft for controlling the clutch, a counter shaft, gear means including an overrunning clutch for connecting the driving and driven shafts around the high speed clutch in an intermediate speed ratio, means including an overrunning clutch for connecting the driving and driven shafts through the countershaft around the clutch in a low speed ratio, said intermediate speed means including a friction clutch for operatively connecting the gears with the counter shaft, torque responsive means operated by the low speed gear means for controlling the intermediate gear clutch, and means operated by both the low and intermediate speed gear means for depressing the weights to control the high speed clutch.

9. In an automatic transmission, a driving shaft, a driven shaft, a friction clutch for connecting the shafts in a high speed gear ratio, centrifugal weights associated with the driven shaft for controlling the clutch, a counter shaft, gear means including an overrunning clutch for connecting the driving and driven shafts around the high speed clutch in an intermediate speed ratio, means including an overrunning clutch for connecting the driving and driven shafts through the counter shaft around the clutch in a low speed ratio, said intermediate speed means including a friction clutch for operatively connecting the gears with the countershaft, torque responsive means associated with the low speed gear means for controlling the intermediate gear clutch, means operated by both the low and intermediate speed gear means for depressing the weights to control the high speed clutch, and centrifugal weights pivotally mounted on the counter shaft and coacting with the low speed torque responsive means for controlling the effect of the low speed gear torque responsive means.

10. In an automatic transmission, a driving shaft, a driven shaft, a friction clutch for connecting the shafts in a high speed gear ratio, centrifugal weights associated with the driven shaft for controlling the clutch, a counter shaft, gear means including an overrunning clutch for connecting the driving and driven shafts around the high speed clutch in an intermediate speed ratio, means including an overrunning clutch for connecting the driving and driven shafts through the countershaft around the clutch in a low speed ratio, said intermediate speed means including a friction clutch for operatively connecting the gears with the counter shaft, torque responsive means operated by the low speed gear means for controlling the intermediate gear clutch, means operated by both the low and intermediate speed gear means for depressing the weights to control the high speed clutch, said torque responsive means being arranged to disengage the intermediate gear clutch upon an increase in load resistance, and centrifugal weights pivotally mounted on the counter shaft and operatively connected with the intermediate speed clutch to control the same, said weights being arranged to increase the resistance of the frictional connection against disengagement as the speed of the countershaft is increased.

11. In an automatic variable speed transmission, a driving shaft, a driven shaft, a counter shaft, means for connecting the driving and driven shafts in high, low and intermediate speed ratios, torque actuated means on the driven shaft operated by both the low and intermediate speed ratio means for disengaging the high speed connecting means, and torque actuated means on the counter shaft operated by the low gear means for disconnecting the intermediate speed ratio connecting means.

12. In an automatic variable speed transmission, a driving shaft, a driven shaft, a counter shaft, means for connecting the driving and driven shafts in high, low and intermediate speed ratios, torque actuated means on the driven shaft operated by both the low and intermediate speed ratio means for disengaging the high speed connecting means, said intermediate speed connecting means including a gear having a sleeve rotatably mounted on the counter shaft, an expanding clutch in said sleeve for connecting the gear to the counter shaft and torque actuated means on the counter shaft operated by said low speed gear for controlling the expanding clutch.

ROMEO M. NARDONE.